3,317,551
2-SUBSTITUTED-5-(5-NITRO-2-FURYL)-1,3,4-THIADIAZOLES
Joseph C. Collins, Normal, Ill., assignor to Sterling Drug Inc., New York, N.Y., a corporation of Delaware
No Drawing. Filed June 24, 1964, Ser. No. 377,475
8 Claims. (Cl. 260—302)

This invention relates to novel heterocyclic organic chemical compounds and to intermediates and processes for their preparation. More particularly, the invention is concerned with 2 - substituted - 5 - (5-nitro-2-furyl)-1,3,4-thiadiazoles of the Formula I,

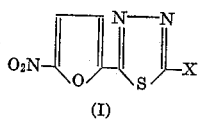

(I)

wherein X is a member of the group consisting of halo, mercapto, lower-alkylmercapto and benzylmercapto.

One aspect of the invention relates to 2-mercapto-5-(5-nitrofuryl)thiadiazoles having the structural Formula II,

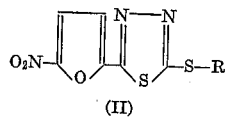

(II)

wherein R is a member of the group consisting of H, lower-alkyl and benzyl.

Another aspect of the invention relates to intermediate 2-halo-5-(5-nitrofuryl)thiadiazoles having the structural Formula III,

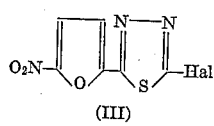

(III)

wherein Hal is halo, that is, a member of the group consisting of iodo, bromo, chloro, and fluoro.

In Formula II, when R is lower-alkyl, the alkyl groups are straight- or branched-chain and preferably have from one to eight carbon atoms. Lower-alkyl is thus exemplified by methyl, ethyl, n-propyl, isopropyl, n-butyl, isobutyl, tert-butyl, n-amyl, n-hexyl, n-heptyl and n-octyl. In Formula II, when R is benzyl, the benzyl group can be unsubstituted or substituted on the aromatic nucleus preferably with from one to three substituents. The substituents can be the same or different and can occupy any of the available positions on the ring. Preferred substituents are selected from the group consisting of halogen, nitro, lower-alkyl and lower-alkoxy. Examples of preferred benzyl group therefore, include benzyl, 4-nitrobenzyl, 2-chlorobenzyl, 2,4-dichlorobenzyl, 4-methyl-2-chlorobenzyl, 3-methoxybenzyl, 3,4,5-trimethoxy-benzyl, 3,5 - dibromobenzyl, 4 - n - butoxybenzyl, and 2-chloro-4-nitrobenzyl.

A further aspect of the invention relates to processes for preparing the compounds of Formula II. 2-mercapto-5-(5-nitro-2-furyl)-1,3,4 - thiadiazole (Formula II, R=H) is conveniently prepared from an intermediate compound of Formula III by reacting the latter with thiourea and hydrolyzing the S-[5-(5-nitro-2-furyl)-1,3,4-thiadiazole-2-isothiuronium] halide first formed. The preparation of the S-[substituted-isothiuronium] halide is carried out by heating a mixture of the reactants in an inert solvent to a temperature of 50 to 150° C. It is convenient to reflux the reactants for 1–3 hours in a solvent which boils within the above temperature range. Suitable solvents include the lower-alkyl alcohols (e.g., methanol, ethanol, 2-propanol, and the like), benzene, toluene, and tetrahydrofuran. The hydrolysis step is conducted by heating the isothiuronium halide intermediate in a dilute mineral acid (e.g., 6 N hydrochloric acid) for a short time, for example, one-half to one hour.

2-mercapto-5-(5-nitro-2-furyl)-1,3,4-thiadiazole, in addition to being useful for the antibacterial purposes more fully described below, is also useful as an intermediate in the process for preparing the compounds of Formula II wherein R is lower-alkyl and benzyl. This process involves the reaction of the mercapto compound with a lower-alkyl or benzyl halide in the presence of an acid acceptor, which removes hydrogen halide formed during the reaction. The acid-acceptor may be a basic solvent such as pyridine, or it may be an inorganic base, e.g., sodium carbonate, calcium carbonate, and the like, employed with an inert solvent, e.g., benzene, toluene, dimethylformamide, tetrahydrofuran, and the like.

An alternative procedure for preparing a compound of Formula II wherein R is lower-alkyl or benzyl comprises reacting a compound of Formula III with a lower-alkyl or benzyl mercaptan according to procedures well known in the art.

The intermediate compounds of Formula III are prepared by halogenating 2-hydroxy-5-(5-nitro-2-furyl)-1,3,4-thiadiazole [which may also be considered in its tautomeric form, 5-(5-nitro-2-furyl)-1,3,4-thiadiazole-2-one]. The latter compound can be produced either by direct hydrolysis or by diazotization and hydrolysis of the known compound, 2-amino-5-(5-nitro-2-furyl) - 1,3,4-thiadiazole. A convenient method of preparation of compounds of Formula III combines the hydrolysis and halogenation in one step. Thus, when 2-amino-5-(5-nitro-2-furyl)-1,3,4-thiadiazole is treated with an excess of concentrated hydrohalic acid and sodium nitrite, 2-halo-5-(5-nitro-2-furyl)-1,3,4-thiadiazole is obtained directly.

The compounds of Formula I have been found by standard bacteriological screening procedures to have in vitro bacteriostatic and bactericidal activity, especially against the species *Staphylococcus aureus*, *Clostridium welchii*, and *Eberthella typhi*. Their usefulness is thus indicated for the treatment of bacterial infections.

The structure of the compounds was determined by their mode of synthesis and their infrared spectra, and was corroborated by the correspondence of calculated and found values of elemental analyses of representative samples.

The following examples illustrate the invention without the latter being limited thereto.

EXAMPLE 1

*2-chloro-5-(5-nitro-2-furyl)-1,3,4-thiadiazole*

To a solution containing 3.0 grams (0.014 mole) of 2-amino-5-(5-nitro-2-furyl)-1,3,4-thiadiazole in 100 ml. of concentrated hydrochloric acid was added a solution containing 1.5 gram (0.022 mole) of sodium nitrite in 10 ml. of water with stirring. After fifteen minutes the mixture was chilled and filtered. The crude product was recrystallized from chloroform. The pure 2-chloro-5-(5-nitro-2-furyl)-1,3,4-thiadiazole, consisting of an orange solid, melted at 143.4–145.8° C. (corr.).

EXAMPLE 2

*2-mercapto-5-(5-nitro-2-furyl)-1,3,4-thiadazole hemihydrate*

A solution containing 15.0 grams (0.065 mole) of 2-chloro-5-(5-nitro-2-furyl)-1,3,4-thiadiazole and 4.9 grams (0.065 mole) of thiourea in 250 ml. of absolute ethanol was refluxed for 2 hours. Water was added to the resulting solution, precipitating 2-mercapto-5-(5-nitro-2-furyl)-1,3,4-thiadiazole hemihydrate.

The crude product was purified by dissolving it in saturated aqueous potassium carbonate, filtering, acidifying the solution with concentrated hydrochloric acid, and collecting the product on a filter. Recrystallized from isopropyl alcohol-water, 2-mercapto-5-(5-nitro-2-furyl)-1,3,4-thiadiazole hemihydrate melted with decomposition at 173.4–173.8° C. (corr.).

EXAMPLE 3

*2-methylmercapto-5-(5-nitro-2-furyl)-1,3,4-thiadiazole*

A mixture containing 5.0 grams (0.021 mole) of 2-mercapto-5-(5-nitro-2-furyl)-1,3,4-thiadiazole, 3.5 grams (0.025 mole) of methyl iodide and 2.2 grams (0.021 mole) of sodium carbonate in 50 ml. of dimethylformamide was heated on the steam bath with stirring for 1 hour. The solid residue was removed by filtration and the filtrate was poured into a large excess of water. The crude product which precipitated was recrystallized from chloroform-hexane, chromatographed on a column of activated megnesium silicate, eluted with chloroform, and recrystallized again from chloroform, giving pure 2-methyl - mercapto - 5 - (5 - nitro - 2 - furyl) - 1,3,4-thiadiazole, melting at 773.4–176.2° C. (corr.).

EXAMPLE 4

*2-hexylmercapto-5-(5-nitro-2-furyl)-1,3,4-thiadiazole*

Following the procedure in Example 3, using n-hexyl bromide in place of methyl iodide, there was prepared 2 - hexylmercapto - 5 - (5 - nitro - 2 - furyl) - 1,3,4 - thiadiazole, melting at 81.8–83.2° C. (corr.).

EXAMPLE 5

*2-bromo-5-(5-nitro-2-furyl)-1,3,4-thiadiazole*

Following the procedure given in Example 1, 2-bromo-5-,5-nitro-2-furyl)-1,3,4-thiadiazole was prepared from 2-amino-5-(5-nitro-2-furyl)-1,3,4-thiadiazole, 48% aqueous hydrobromic acid and sodium nitrite. Recrystallized from chloroform, the pure 2-bromo-5-(5-nitro-2-furyl)-1,3,4-thiadiazole melted at 165.6–166.8° C. (corr.).

EXAMPLE 6

*2-fluoro-5-(5-nitro-2-furyl)-1,3,4-thiadiazole*

Following the procedure given in Example 1, 2-fluoro-5-(5-nitro-2-furyl)-1,3,4-thiadiazole is prepared from 2-amino-5-(5-nitro-2-furyl)-1,3,4-thiadiazole, aqueous hydrofluoric acid and sodium nitrite.

EXAMPLE 7

*2-iodo-5-(5-nitro-2-furyl)-1,3,4-thiadiazole*

Following the procedure given in Example 1, 2-iodo-5-(5-nitro-2-furyl)-1,3,4-thiadiazole is prepared from 2-amino-5-(5-nitro-2-furyl)-1,3,4-thiadiazole, aqueous hydriodic acid and sodium nitrite.

Following the procedure given in Example 3, the following compounds of the invention are prepared using the indicated halide compound in place of methyl iodide:

2-ethylmercapto-5-(5-nitro-2-furyl)-1,3,4-thiadiazole, using ethyl bromide;

5 - (5 - nitro - 2 - furyl) - 2 - (n - octylmercapto) - 1,3,4-thiadiazole, using n-octyl bromide;

2-benzylmercapto-5-(5-nitro-2-furyl)-1,3,4-thiadiazole, using benzyl chloride;

2 - (4 - nitrobenzylmercapto) - 5 - (5 - nitro - 2 - furyl)-1,3,4-thiadiazole, using 4-nitrobenzyl chloride;

2 - (2 - chlorobenzylmercapto) - 5 - (5 - nitro - 2 - furyl)-1,3,4-thiadiazole, using 2-chlorobenzyl chloride;

2 - (4 - methyl - 2 - chlorobenzylmercapto) - 5 - (5 - nitro-2-furyl)-1,3,4-thiadiazole, using 4-methyl-2-chlorobenzyl chloride;

2 - (3 - methoxybenzylmercapto) - 5 - (5 - nitro - 2-furyl)-1,3,4-thiadiazole, using 3-methoxybenzyl chloride;

2 - (4 - fluorobenzylmarcapto) - 5 - (5 - nitro - 2 - furyl)-1,3,4-thiadiazole, using 4-fluorobenzyl fluoride;

2 - (4 - butoxybenzylmercapto) - 5 - (5 - nitro - 2 - furyl)-1,3,4-thiadiazole, using 4-butoxybenzyl chloride;

2 - (4 - tert - butylbenzylmercapto) - 5 - (5 - nitro - 2-furyl)-1,3,4-thiadiazole, using 4-(tert-butyl) benzyl chloride;

2 - (3,4,5 - trimethoxybenzylmercapto) - 5 - (5 - nitro-2-furyl)-1,3,4-thiadiazole, using 3,4,5-trimethoxybenzyl chloride; and 2 - (2,4 - dinitrobenzylmercapto) - 5 - (5 - nitro - 2 - furyl)-1,3,4-thiadiazole, using 2,4-dinitrobenzyl chloride.

The compounds which were prepared by the above procedures were found when tested according to standard in vitro bacteriological testing procedures to have bacteriostatic and bactericidal activities. For example, the minimum bactericidal and bacteriostatic concentration of 2-chloro-5-(5-nitrofuryl)-1,3,4-thiadiazole (Formula I, X=Cl) in aqueous solution was found to be 10 parts per million (p.p.m.). The minimum bacteriostatic concentration of 2-hexylmercapto-5-(5-nitro-2-furyl)-1,3,4-thiadiazole (Formula I, X=C$_6$H$_{13}$—S—) in aqueous solution was found to be 0.75 p.p.m. The minimum bactericidal concentration for this latter compound was 2.5 p.p.m.

I claim:

1. A compound of the formula

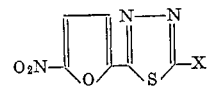

wherein X is a member of the group consisting of halo, mercapto, lower-alkylmercapto and benzylmercapto.

2. A compound of the formula

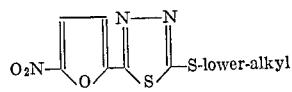

wherein lower-alkyl contains from one to eight carbon atoms.

3. 2-mercapto-5-(5-nitro-2-furyl)-1,3,4-thiadiazole.

4. 2 - methylmercapto - 5 - (5 - nitro - 2 - furyl) - 1,3,4-thiadiazole.

5. 2 - hexylmercapto - 5 - (5 - nitro - 2 - furyl) - 1,3,4-thiadiazole.

6. A compound of the formula

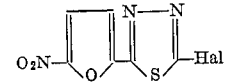

wherein Hal is halogen.

7. 2-chloro-5-(5-nitro-2-furyl)-1,3,4-thiadiazole.

8. 2-bromo-5-(5-nitro-2-furyl)-1,3,4-thiadiazole.

References Cited by the Examiner

UNITED STATES PATENTS 2,992,225   7/1961   Dickson _____ 260—302

OTHER REFERENCES

Burger: Medicinal Chemistry (New York, 1960), pages 74–77 and 1135.

Reid: Organic Chemistry of Bivalent Sulfur, vol. I (New York, 1958), pages 25–29 and 32–35.

Skagius et al.: Antibiotics and Chemotherapy, vol. 11, pages 37–45 (1961).

ALEX MAZEL, *Primary Examiner.*

HENRY R. JILES, *Examiner.*

ALTON D. ROLLINS, *Assistant Examiner.*